(12) United States Patent
Spear

(10) Patent No.: US 8,661,287 B2
(45) Date of Patent: Feb. 25, 2014

(54) AUTOMATICALLY PERFORMING FAILOVER OPERATIONS WITH A LOAD BALANCER

(75) Inventor: Thomas D. Spear, Kingwood, TX (US)

(73) Assignee: Rackspace US, Inc., San Antonio, TX (US)

( * ) Notice: Subject to any disclaimer, the term of this patent is extended or adjusted under 35 U.S.C. 154(b) by 285 days.

(21) Appl. No.: 13/173,775

(22) Filed: Jun. 30, 2011

(65) Prior Publication Data

US 2013/0007505 A1   Jan. 3, 2013

(51) Int. Cl.
*G06F 11/00*   (2006.01)

(52) U.S. Cl.
USPC ........................................... 714/4.11; 714/11

(58) Field of Classification Search
USPC .............. 714/4.11, 4.1, 4.12, 11–13; 718/105
See application file for complete search history.

(56) References Cited

U.S. PATENT DOCUMENTS

| | | | |
|---|---|---|---|
| 7,159,234 B1 * | 1/2007 | Murphy et al. | 725/87 |
| 7,990,847 B1 * | 8/2011 | Leroy et al. | 370/216 |
| 2009/0103430 A1 * | 4/2009 | Wang | 370/221 |

OTHER PUBLICATIONS

Red Hat, Inc., "Configuring and Managing a Red Hat Cluster: Red Hat Cluster for Red Hat Enterprise Linux 5," 2007, pp. 1-86.

* cited by examiner

*Primary Examiner* — Dieu-Minh Le
(74) *Attorney, Agent, or Firm* — Trop, Pruner & Hu, P.C.

(57) ABSTRACT

A load balancer includes a failover logic unit to identify servers to execute services, generate and store in the load balancer a failover rule and a service rule, and to determine a failure in a first server that executes a first service responsive to a lack of response by the first server to a keepalive message sent by the load balancer to the first server. The load balancer can then perform an operation to cause an automatic failover of the first service to another server based on the failover and service rules.

17 Claims, 3 Drawing Sheets

AUTOMATICALLY PERFORMING FAILOVER OPERATIONS WITH A LOAD BALANCER

BACKGROUND

In some server arrangements such as in a data center, services such as a web page service or a database service can be implemented on multiple server systems configured in a cluster. When one of the servers fails or an entire service cannot be brought up, typically human interaction is required to access diagnostic logs and take corrective action, leading to downtime for the customer.

This downtime results in a web site and/or other services that depend on the downed server to be unavailable for use. In some cases, a person having the necessary proficiency to repair the failed node, or worse, the failed cluster, is not available for several hours, or the repair requires a significant time, resulting in those services being offline or otherwise unavailable for an indeterminate duration.

SUMMARY OF THE INVENTION

According to one aspect of the present invention, a method includes receiving, in a load balancer, a status message from services operating on servers coupled behind the load balancer, and detecting a failure of a first service executing on a first server based on a status message. Responsive to this detection, a second server can be automatically enabled by the load balancer to execute the first service. In this way, downtime can be minimized. One implementation may be in a cluster including the multiple servers, where the load balancer acts as a cluster manager.

The load balancer may be configured for such operation by generating a failover rule including entries each having a service identifier, a primary server identifier and a secondary server identifier, and storing the failover rule in the load balancer. The configuration may further include generating a service rule including entries each having a service identifier and a primary server identifier, and storing the service rule in the load balancer.

Another aspect is directed to a load balancer that includes a failover logic unit to identify servers to execute services, generate and store in the load balancer a failover rule and a service rule, and to determine a failure in a first server that executes a first service responsive to a lack of response by the first server to a keepalive message sent by the load balancer to the first server. The load balancer can then perform an operation to cause an automatic failover of the first service to another server based on the failover and service rules.

DETAILED DESCRIPTION

In various embodiments, load balancer hardware can be used to detect when a failure occurs for a given service such as a web or database service running on a client server within a data center such as a multi-tenant data center. In addition, the load balancer itself can leverage this information to enable a failover service on a different server to be activated to take the place of the failing service. Both the detection and the failover control can be performed by the load balancer automatically and without human involvement.

The detection mechanism can leverage information obtained from the load balancer during a health check that the load balancer regularly runs on services available on servers behind the load balancer. Based on a failure of this health check, such as a lack of a response message to a request communicated to a given port of a server, the load balancer itself can leverage this information in order to prevent service requests from being sent to a server or service that is unavailable, which enables the appearance to the casual web visitor that the site is up and nothing is wrong.

In some embodiments, extensions to this load balancer failover technique can provide for a cluster-based approach in which two (or more) clusters can be configured as a primary cluster and a secondary cluster, and on a failure to the primary cluster, the secondary cluster can be activated. In another extension, multiple failover load balancers can be located in the same or different data centers such that if one load balancer fails, the failover load balancer can detect the failure and bring up the impacted services on servers behind this failover load balancer.

Figure 1:
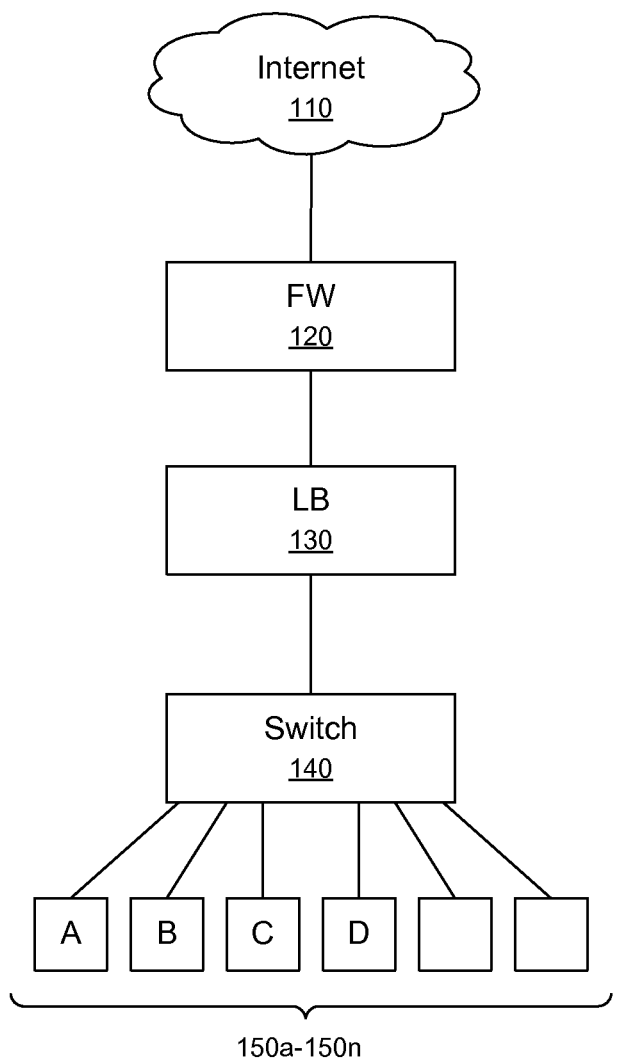
FIG. 1 is a block diagram of a network architecture in accordance with an embodiment of the present invention.

Referring now to FIG. 1, shown is a block diagram of a network architecture in accordance with an embodiment of the present invention. As shown in FIG. 1, architecture 100 may be of a data center such as a multi-tenant data center, although the scope of the present invention is not so limited. More specifically, the portion of the architecture of FIG. 1 may correspond to a high level view of a cluster. As seen in FIG. 1, the data center can be connected to the public Internet 110 via a firewall 120. Although shown at this high level in the embodiment of FIG. 1, understand that additional components such as routers, switches and so forth may be interposed between the Internet and firewall 110, or between firewall 110 and the servers in a given environment. In addition, although only a single firewall is shown for ease of illustration, understand that in various embodiments, multiple such firewalls may be provided, where the firewalls can each be assigned to protect a variety of devices coupled behind the firewall.

In some embodiments, such as in a multi-tenant data center environment, there can be a dedicated compute domain, where various devices such as servers, storage and so forth can be dedicated to a single client and for which there may be one or more firewalls dedicated to the given client. In addition, the multi-tenant data center may further include a so-called cloud compute domain, where various physical devices can have different virtual instances running on each physical device, where each of the instances can provide computing resources to a given client, e.g., in a load-based manner. Thus in the dedicated compute domain, all hardware resources are associated with a single client of the multi-tenant data center, while in the cloud compute domain, each hardware resource can be associated with a single, or multiple clients.

Still referring to FIG. 1, firewall 120 may couple to a load balancer 130. Although the scope of the present invention is not limited in this regard, the load balancer may be a BigIP F5 load balancer. In general, load balancer 130 may include processing circuitry, communication circuitry, and instructions, stored in a non-transitory computer readable storage medium that can perform load balancing activities, and further perform automated failovers in accordance with an embodiment of the present invention. In various embodiments, load balancer 130 may act to distribute incoming requests to multiple devices coupled behind the load balancer to thus distribute the load so as to enable reduced latency and higher throughput. More specifically, load balancer 130 may, based on the type of request, select one of multiple servers behind the load balancer to receive and handle the request to evenly distribute the load across the multiple servers. In various embodiments, the load balancer can also be configured in such a way so as to not send traffic to a given server in a group of servers if it detects that the server is not responding to health check messages.

As further seen in FIG. 1, coupled behind load balancer 130 may be one or more switches 140 that are used to route communications to and between a plurality of servers 150*a*-150*n*, also referred to as nodes. There may also be a switch placed alongside the load balancer, directly behind the firewall, to allow for access to devices that do not need to be load balanced, though it has been omitted from the drawing for clarity's sake. Although the scope of the present invention is not limited in this regard, in certain embodiments each server 150 may be a physical server such as a blade or rack-based server, although other implementations are possible. Furthermore, understand that each server may include multiple instances of hypervisors each of which can be configured to run an operating system and various applications thereon, e.g., as one or more virtual machines (VMs).

Servers 150 may be of any design, running any modern server operating system such as LINUX, Microsoft WINDOWS, or UNIX OS. As used herein, a server can refer to the following: a computer, physical or virtual; a service running on the computer; and/or any part of the environment for a given web site accessible by a technically astute person. In one particular embodiment, servers 150 may run on a RedHat Enterprise LINUX 5 or RedHat Enterprise LINUX 6 OS, and use standard RedHat update channels, along with a RedHat-provided version of mysql. And more generally, a cluster of the architecture may run cluster service software, such as a RedHat Cluster suite. For ease of illustration, the servers can store mysql data on local internal hard drives, so as to minimize complexity from using shared storage. Of course, additional components can be present in different embodiments. For example, the servers may further couple to a storage system such as a storage attached network (SAN), e.g., via a fibre channel or other switch.

Load balancer 130 is generally configured with a set of rules to define a service as far as the load balancer is concerned. The rules can be from simple, e.g., "send traffic to server a, send traffic to server b, send traffic to server c, send traffic to server a" to more complex rules, as described here.

In all configurations, load balancer 130 can send health checks to all server computers that it is configured to send them to. If a server computer goes down, then the health checks fail to be responded to, and the same occurs if someone manually disables a given service on the server computer. When that happens, load balancer 130 will remove the server computer from the rotation, which essentially means that it will pretend that server computer does not exist, and therefore not send traffic to that server computer.

As an example of the simple configuration above, assume that server computers a, b, and c are all running web services. The web service runs on all three server computers at the same time, and the load balancer has a single virtual IP address (VIP) on the outside interface that it listens for requests on. When traffic is received, the load balancer keeps track of the last server computer it sent traffic to, and will send the next web request to the next server computer in the list. When the end of the list is received, it will start over at the beginning of the list. In a more advanced configuration, the load balancer can also be configured to keep track of how many connections it has open to each server computer, and send the next incoming request to whichever server computer has the least number of connections.

Also there can be server computer configurations that use web cookies to store login information. This login information is tied to whichever server computer the person that logged in was connected to at the time of login and cannot be transferred between the server computers, so the load balancer can be setup to detect when a cookie has been transmitted, and use that information to keep requests from a specific computer on the Internet "locked" to the server computer where the login took place. The above configurations are all common uses of a load balancer, and they are the primary thing a load balancer was designed to do. These configurations all apply to web traffic coming in from the Internet to the load balancer's outside interface.

In an even more advanced configuration, the load balancer's inside interface can be configured to have a VIP for the purposes of balancing traffic that is inside a customer's environment. A common use here is for multiple server computers that are slave mysql server computers. They would all be part of the rule set for that inside VIP, and the web services can be on the rule set for the outside VIP. For the example below, both VIPs are setup to balance to whichever server computer has the least connections.

Assume a web request is received at the outside VIP, and is balanced to a web service. The web service makes a request to the inside VIP for database information, and the load balancer directs the traffic to a database service. The database service sends information back to the web service, which then uses that information to generate a web page with the appropriate information, and send that web page out to the computer on the Internet that requested the web page.

As mentioned above, load balancer 130 may also be configured to perform failover mechanisms such that when a particular service executing on one of servers 150 fails for some reason, the load balancer itself can automatically disable the sending of traffic to a failed server 150 for a given service, in order to provide for a seamless switching over of the failing service from one server to another, increasing availability and reducing downtime. Such automatic switching on failure detection can be performed without manual intervention, in various embodiments.

Load balancer 130 may be configured with a single non-balanced VIP on its outside interface for web servers and a floating VIP on its inside interface for mysql servers, in various embodiments. In various embodiments, the load balancer may be configured to send health status messages, also referred to herein as "keepalives" to any and/or all servers positioned behind the load balancer. When however a keepalive response is not received as expected from a server, the load balancer can be configured in such a way as to prevent traffic from being directed to the server that is down. Later when the issue in the down server has been resolved (e.g., manually), the load balancer can then switch back to allow traffic to be directed to the server which was down but is now repaired once responses to keepalive messages are being received again.

For purposes of discussion herein, assume that a first service is executing on a first server A (server 150*a*) and that a second service is executing on a second server C (server 150*c*). For purposes of illustration and not as limitation, assume that the first service corresponds to web serving to provide web page information to a requesting user, while the second service can be a storage service such as providing requested data to a requesting user.

During normal operation load balancer 130 may periodically transmit health check messages to the various servers behind it. Health checks can be sent to all servers for each rule set, and more specifically to a port that the load balancer is configured to be directing traffic to for a given service (rule set). In this way, load balancer 130 can determine whether a failure has occurred on a given server, based on a lack of a response to this health check message.

Responsive to a failure of one of these health check messages, load balancer 130 can cause incoming requests for the failing service to be routed instead to a secondary server for the service. Thus in the implementation shown in FIG. 1, assume that server B (server 150*b*) is designated as a secondary server for the first service and server D (server 150*d*) is designated as a second server for the second service. Thus when the service fails on the primary server, load balancer 130 may begin sending requests for the failing service to the secondary server.

In addition, load balancer 130 may cause a message to be sent, e.g., to an administrator, to indicate the failure such that manual intervention can be performed to resolve the error or other condition in the primary server, or an outside service may report the error. Although shown at this high level in the embodiment of FIG. 1, understand the scope of the present invention is not limited in this regard.

Particularly for implementations in which the service is a database or file storage service, both servers can be configured to replicate one another, so that in the event the primary goes down, the other has identical data. And, when the primary returns from resolution of its failure, it replicates data changes from the secondary (now active) server.

To configure the servers for replication, ports may be replicated between the servers. Assume a first server as primary (active) and a second server as secondary (passive). To configure for replication, a first port (e.g., 3306) on the primary server may replicate to a second port (e.g., 3307) on both the primary and secondary servers, and further replicate to a first port (e.g., 3306) on the secondary server. In the event of the primary server failing, the load balancer may terminate or stop the second port instance of mysql on the passive server and configure it as a slave to the first port instance on the passive server (now the active server). Upon the primary server's return after repair, the load balancer can change both primary instances to replicate from the first port of the passive server. After replication such that the primary server has a data configuration that is coherent with the secondary server, both instances on the primary server can be stopped, and the first server is again configured to be the primary. Thus on the primary server, its first port is configured again as the master and its second port configured as a slave. Thereafter, both instances can be stopped on the secondary server, and both ports can be reconfigured to slave to the primary port on the master server.

In other implementations a master-master replication may occur where each master replicates to the other server on the same port on both servers, e.g., port 3306 in the case of MySQL databases.

Figure 2:
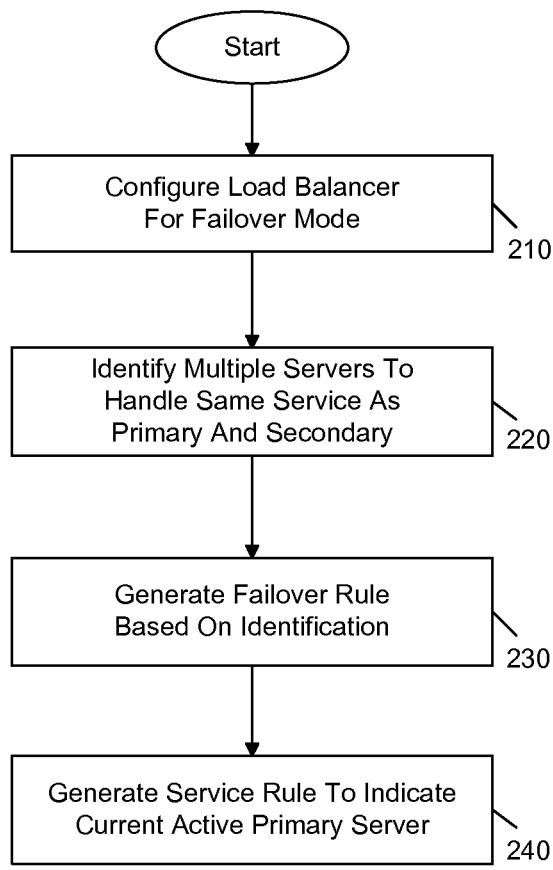
FIG. 2 is a flow diagram of a configuration method in accordance with an embodiment of the present invention.

To enable failover operation, a cluster first can be configured appropriately. Referring now to FIG. 2, shown is a flow diagram of a configuration method in accordance with an embodiment of the present invention. As shown in FIG. 2, various operations can be performed to configure the load balancer for failure detection and failover operation in accordance with an embodiment of the present invention.

Method 200, which may be implemented during configuration of a load balancer as a "cluster manager," can begin at block 210 by configuring the load balancer in such a way that health checks are sent to all servers but ignoring failure on all but the primary, unless the health check for the primary fails, in which case a health check sent to the secondary must pass once the service is running to ensure uptime. This configuration may include providing software, hardware, firmware or combinations thereof to the load balancer to enable it to perform failover operations. As will be discussed further below, in one embodiment this configuration may provide for execution of a method such as FIG. 3 below. Also, the configuration may include providing failover scripts for the load balancer to use to handle different failure situations.

In addition to providing this configuration of the load balancer, an identification of the various types of services listening behind the load balancer can occur. Specifically as shown in FIG. 2 at block 220, the multiple servers behind the load balancer can be identified and in addition, given services to have traffic sent to, such as web, email, database or so forth. Based on this identification of various servers to be primary and secondary, a failover rule may be generated (block 230). In one embodiment, this failover rule can be populated with entries for the various services to be handled by the servers behind the load balancer. In one embodiment, the failover rule can include multiple entries, each of which identifies the given service, and the servers that are able to handle the service. For example, for each service an entry may be provided that includes an identification field for the service, a primary field to identify a primary server configured to handle the service, and a secondary field to identify a secondary server capable of handling the service. Note that in this embodiment although three such fields are identified, understand the scope of the present invention is not limited in this regard and in some implementations, multiple primary servers and multiple secondary servers can be present and can be identified in the fields discussed. In addition, other fields may also be present in a given embodiment. In addition to the failover rule, a service rule may be generated (block 240). This rule can be populated with entries that identify each service and the corresponding server on which it is currently executing.

Figure 3:
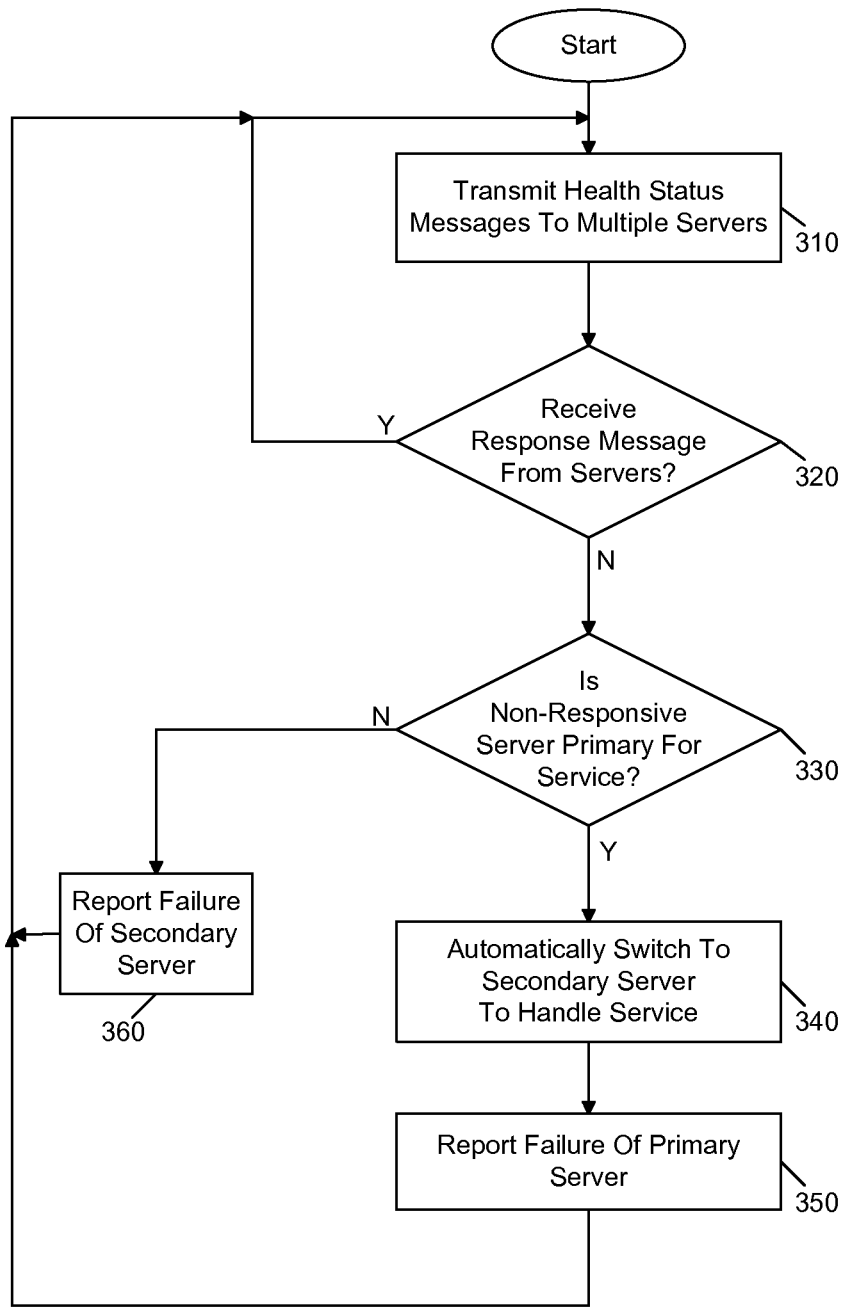
FIG. 3 is a flow diagram of an automated failover method executed by a load balancer in accordance with an embodiment of the present invention.

Referring now to FIG. 3, shown is a flow diagram of an automated failover method executed by a load balancer in accordance with an embodiment of the present invention. As shown in FIG. 3, method 300 may occur during normal operation of a load balancer configured to perform automated failovers. As seen in FIG. 3, method 300 may begin by transmitting health messages to multiple servers (block 310). For example, a load balancer can be configured to periodically transmit a health status message such as keep alives to all servers that are coupled behind it. As an example, a load balancer can be configured to send such a message at a configurable interval, typically in seconds. In one embodiment, these messages can be sent to each physical server to thus determine health status. Or in other embodiments, multiple such messages can be transmitted to each physical server, where each message is destined to a particular port that a service listens to on a given server.

As these health check messages are sent to determine status of the servers, each of the services, or destinations, on the servers can transmit back a response message to the load balancer. Accordingly, at diamond 320 it may be determined whether a response has been received for each service (or other destination). If so, that service or other destination is operating properly. Accordingly, control passes back to block 310 for transmission of the next health status message. Note here that the primary server response is the only one that matters, because as long as the secondary server is not running the service (as it would not be, in a cluster), then the secondary server will not respond to the health checks until the load balancer logs in and enables the service on the secondary server. If one or more of the receivers of the health status message does not respond with the appropriate message, or at all, then control instead passes to diamond 330. There, it may be determined whether the non-responsive server is a primary server for a given service. If not, control passes to block 360 where a failure can be reported for this non-responsive server. As one example, the load balancer can send a failure message to a system administrator to thus identify the failure so that the system administrator can take appropriate action to manually resolve the failure. Of course in other embodiments, rather than this message destined to a user, the message can be sent to another destination such as some type of automated failure handling mechanism to attempt to resolve the problem automatically without user involvement. Then control passes back to block 310 for transmission of the next health status message. In other embodiments, an outside monitoring entity can handle failure reporting, such that notification of the service or server failure is up to that outside monitoring entity. Here it is noted that even with a VIP on a load balancer, the servers will still have their own individual IP addresses and can be accessed directly without the use of the load balancer, thus enabling outside monitoring to check that services are still operating correctly and triggering events like alert tickets or emails to be generated, if such outside monitoring entity is designed to do so.

Still referring to FIG. 3, if instead at diamond 330 it is determined that the non-responsive server is a primary server for a given service, control passes to block 340 where the load balancer can switch the service from the primary server to a secondary server to enable the secondary server to handle the service. In one embodiment this operation can occur by having the load balancer access the failover rule to identify the secondary server for the service. Then based on this identification, the load balancer can update a service rule for the service to identify the secondary server as the active destination of service requests for the given service. Accordingly, the load balancer would at this point use a failover script to login to the secondary server for the service, and enable the service on this server, if needed, so that the service may continue with minimal or no down time such that incoming requests for the service can be directed to the secondary server, which is now identified in the service table as the destination server for handling the service. Of course, the failure may also be reported (block 350), as described above to enable manual resolution of the failure.

Note that the operations performed in FIG. 3 may be continuously performed. Furthermore, although not shown for ease of illustration an additional reconfiguring of a previously-failed primary server that has been repaired, to again be the primary server, can occur. For example, when the load balancer receives an indication from its health status messages that the server has been repaired, e.g., based on a response to the health status check by the fixed server, the service rule can again be updated to designate the repaired primary server to again be the primary server. Although shown with this particular implementation in the embodiment of FIG. 3, understand the scope of the present invention is not limited in this regard.

In some embodiments, if a customer has a failure that an available cluster software could not handle, script code of a load balancer used to handle failures can be modified to handle new situations as they come up. In this way, clusters can be more resilient to downtime.

Embodiments may be implemented in code and may be stored on a storage medium having stored thereon instructions which can be used to program a system to perform the instructions. The storage medium may include, but is not limited to, any type of non-transitory storage medium suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
designating a first port on a first server as a master port, and designating a second port on the first server as a slave port;
designating a first port on a second server as a first replication port, and designating a second port on the second server as a second replication port;
receiving, in a load balancer, a status message from each of a plurality of services operating on a plurality of servers coupled behind the load balancer;
detecting, in the load balancer, a failure of a first service executing on the first server of the plurality of servers based on a status message; and
responsive to the failure detection, automatically enabling the second server corresponding to a failover server to the first server to enable a failover service to be activated to execute the first service, via the load balancer.

2. The method of claim 1, wherein the plurality of servers comprises a cluster.

3. The method of claim 1, further comprising reporting the failure via an outside monitoring entity.

4. The method of claim 1, further comprising detecting the failure due to a failure to receive the status message responsive to a health check message sent from the load balancer to the first server.

5. The method of claim 1, further comprising determining if the first server is a primary server for the first service, and if not ignoring the failure for the first service and not automatically enabling the second server to enable the failover service to execute the first service.

6. The method of claim 1, further comprising generating a failover rule including a plurality of entries each having a service identifier, a primary server identifier and a secondary server identifier, and storing the failover rule in the load balancer.

7. The method of claim 6, further comprising generating a service rule including a plurality of entries each having a service identifier and a primary server identifier, and storing the service rule in the load balancer.

8. The method of claim 1, further comprising replicating data updates to the first port on the first server to the second port on the first server and to the first and second ports on the second server.

9. The method of claim 1, further comprising responsive to the failure of the first service, designating the first port on the second server as the master port.

10. The method of claim 9, after the failure has been resolved, designating the first port on the first server as the master port.

11. A load balancer comprising:
a failover logic unit to identify a plurality of servers coupled behind the load balancer to execute a plurality of services, generate and store in the load balancer a failover rule including a plurality of entries each having a service identifier, a primary server identifier and a secondary server identifier, generate and store in the load balancer a service rule including a plurality of entries each having a service identifier and a primary server identifier, and to determine a failure in a first server that executes a first service responsive to a lack of response by the first server to a keepalive message sent by the load balancer to the first server, wherein, if the first server is a secondary server for a second service, the failover logic unit is to ignore the failure in the first server, and not switch the second service from a primary server for the second service.

12. The load balancer of claim 11, wherein the failover logic unit is further to switch the first service from the first server to a second server based on an entry in the failover rule to enable the second server to handle the first service, responsive to the lack of response, the load balancer to log in to the second server using a failover script to enable the first service on the second server.

13. The load balancer of claim 11, further comprising a monitoring entity to report the failure of the first server to an administrator.

14. An article comprising a non-transitory machine-accessible storage medium including instructions that when executed cause a system to:

receive, in a load balancer, a status message from each of a plurality of services operating on a plurality of servers coupled behind the load balancer;
detect a failure of a first service executing on a first server of the plurality of servers based on a status message; and
determine if the first server is a primary server for the first service, automatically enable a second server corresponding to a failover server to the first server to activate a failover service to execute the first service, via the load balancer, and if not ignore the failure for the first service and not automatically enable the second server to execute the first service.

15. The article of claim 14, further comprising instructions that when executed enable the system to configure the load balancer as a cluster manager.

16. The article of claim 14, further comprising instructions that when executed enable the system to report the failure via an outside monitoring entity.

17. The article of claim 14, further comprising instructions that when executed enable the system to detect the failure due to a failure to receive the status message responsive to a health check message sent from the load balancer to the first server.

* * * * *